Sept. 5, 1933.    R. W. REGENSBURGER    1,925,405
EGG BREAKER
Filed Feb. 18, 1931
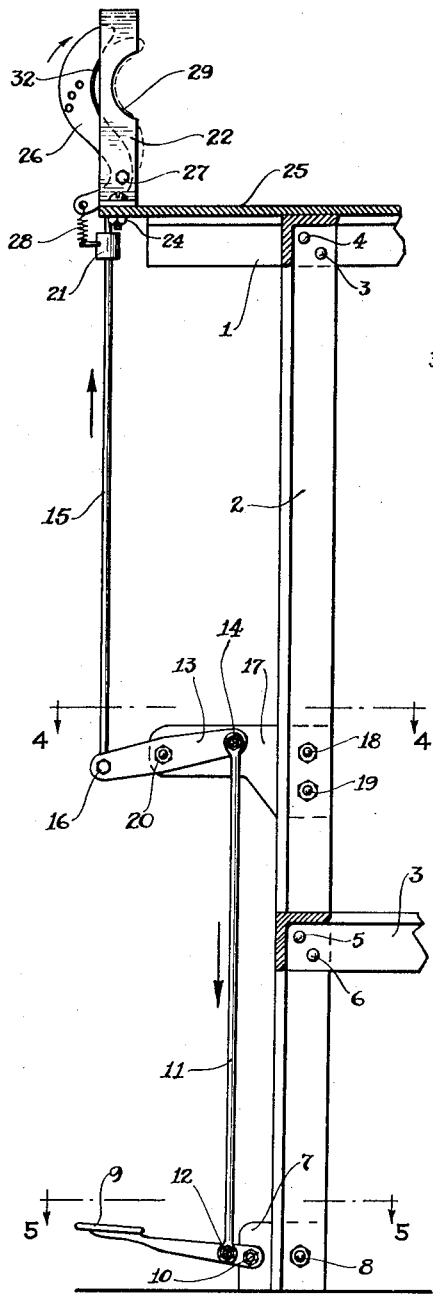
Fig. 1
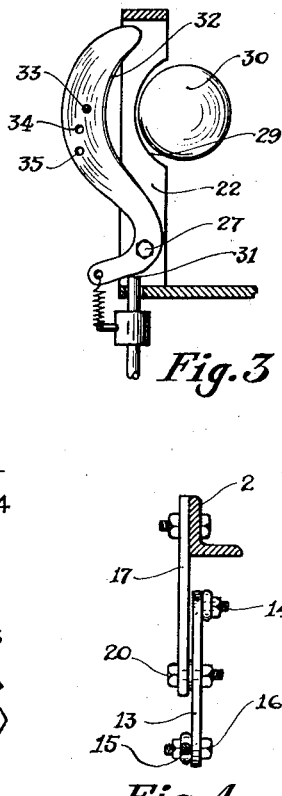
Fig. 2
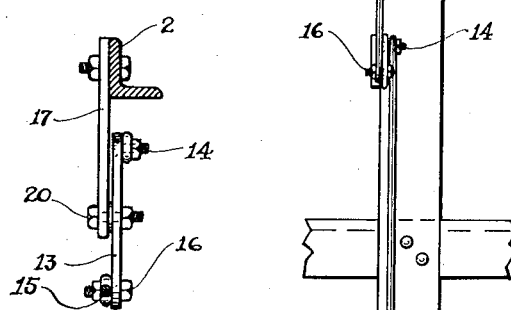
Fig. 3
Fig. 4
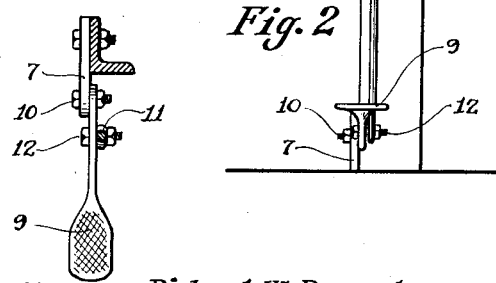
Fig. 5
Richard W. Regensburger
INVENTOR
BY ATTORNEY
WITNESS Patented Sept. 5, 1933

1,925,405

UNITED STATES PATENT OFFICE 1,925,405

EGG BREAKER

Richard W. Regensburger, Chicago, Ill., assignor, by mesne assignments, to Industrial Patents Corporation, Chicago, Ill., a corporation of Delaware Application February 18, 1931. Serial No. 516,631

7 Claims. (Cl. 146—2)

My invention relates to egg breakers particularly designed for factory operations. In the drawing: Figure 1, a side view of my egg breaker, appropriately mounted to an egg breaker's table; Figure 2, a front view; Figure 3, a detail of the knife portion of the breaker. Figure 4, a plan view of A—A of Figure 1; and Figure 5, a plan view at B—B of Figure 1. In the several figures, similar characters of reference indicate identical parts in the several figures.

Referring more particularly to Figure 1, it will be noted that the egg breaker's table, upon which the device is mounted, comprises an angle iron framework, of which is shown members 1, 2, and 3, member 1 being rigidly affixed to member 2 by bolts 3 and 4, member 3 being rigidly affixed to member 2 by bolts 5 and 6.

Plate 7 is rigidly affixed to member 2 by bolt 8. Pedal 9 is pivotally mounted to plate 7 by bolt 10 and pivotally mounted to rod by bolt 12. Rod 11 is pivotally mounted to bar 13 by bolt 14. Rod 15 is pivotally mounted to bar 13 by bolt 16. Plate 17 is rigidly affixed to member 2 by bolts 18 and 19 and furnishes a support on which bar 13 is pivotally mounted by bolt 20. Rod 15 passes through fixed collar 21 and guard 22 is provided, being rigidly mounted by bolts 23 and 24 on platform 25, which is rigidly affixed to member 16. Knife 26 is pivotally mounted on pin 27. Pin 27 consists of a bolt passing through appropriate holes in guard 22. Spring 28 is rigidly affixed to collar 21 and knife 26, thus retaining knife 26 in the retracted position shown in Figure 1.

Guard 22 is cut out to form arc 29.

When an egg, as 30, is held in contact with arc 29, it is in a position for breaking. Breaking is performed by depressing the pedal 9, which draws down rod 11 and forces up rod 15 through bar 13. Rod 15 at its free end contacts with knife 26 at 31, causing knife 26 to pivot on pin 27 and throwing the blade 32 of knife 26 sufficiently far forward to clear the arc 29.

It has been noted that knife 26 is provided with three holes, as 33, 34, and 35, adapted to permit the insertion of a pin 36 by contact with guard 22, which inhibits a forward motion of knife 26, permitting blade edge 32 to clear arc 29, the desired distance, which distance is controlled by insertion of pin in the hole desired, it being clear that insertion in hole 35 would permit greater clearance than insertion in hole 33. As noted before I provided positive means for control of the amount of penetration of the knife edge into the egg.

It must be borne in mind that egg breaking on a commercial scale in factory operations must of necessity be done rapidly. It is well known that an egg consists primarily of fragile shell having an inner membranous lining, within which a yoke encased in a delicate membrane is supported by the cords of chalazea in the white which consists of liquid albumin. It must be noted that the yolk is a separate mass within the white, and consequently if an egg in motion, as for example in cracking, is suddenly stopped, the inertia of the yolk will cause it to continue its travel through the white, carrying it closer to the side of the shell toward which it is traveling.

In commercial practice at the present time, eggs being broken out are commonly struck on a sharp edged instrument to crack the shells. The motion of the egg is ordinarily arrested by the impact of the instrument which is a knife, and consequently the yolk is forced close to the side of the shell penetrated by the knife. As a result, the yolk membrane is ruptured.

Where it is desired to separate the whites from the yolk, the rupture of the yolk membrane prevents practicable separation on a commercial scale. My invention avoids such rupture of the yolk membrane since an egg may be placed before the breaker and allow it to come to a complete rest before the shell is cracked.

In addition, my invention controls the depth of penetration, avoiding the possibility of the knife blade entering too deeply into the shell and thereby puncturing the yolk and membrane.

The arcuate edge of the breaker knife as shown in the drawing is of considerable advantage in operation. To permit easy opening of the egg it is claimed that the shell of the egg must be cracked around a considerable portion of the periphery to permit easy opening. I have found that a curved edge knife of the type shown in the drawing having an arc of substantially the same radii as an egg need only penetrate the egg a very small distance to crack the shell over that portion of the circumference contacted by the knife. On the other hand, it is claimed that if a straight edged knife be used it is necessary to enter the egg a much greater distance to crack the egg over the same mark on the periphery. With my device it is practical to use the arcuate edge as the egg is perfectly centered before the cracking stroke of the knife.

In the present commercial practice where the operator strikes the egg on a sharp instrument, it would be impractical to use an arcuate blade as the speed of the operation precludes the degree of accuracy necessary to strike a knife in practice. It will be seen that in breaking eggs by my invention the contact causing the cracking of the shell results from the motion of the blade toward the egg rather than a motion of the egg toward the blade.

I have found in practice that where my invention is used, the crack formed in the egg is cleaner than can be obtained by a straight edged type instrument and considerable shattering found when a straight edged instrument is used is avoided. I have found, also, that the crack in the shell continuing beyond the points of penetration travel more evenly about the circumference than is the case where a straight edged instrument is used.

After the egg shell is cut through by the knife in the manner which has been described, it is a simple matter for the operator to open up the egg shell by separating the two parts, permitting the contents to be deposited into an egg cup or other receptacle as desired. And it has been found in practice that the use of this invention avoids shattering of the shell, so that eggs may be broken out of the shell free from shell fragments.

Where desired, the device which I have described may be operated by mechanical means. For example, a knife breaker may be set up and operated by a line shaft provided for the battery of breakers with suitable cams at each unit to operate the knife at a desired frequency.

It will be understood that changes may be made in the design and manner of operating of the hereinbefore described knife without departing from the spirit of my invention as described in the following claims.

I claim:

1. A device of the class described, comprising a foot pedal pivotally mounted at one end to a fixed support, said foot pedal pivotally mounted to a rod at a point between the free end and the fixed end of said foot pedal, said rod pivotally mounted to one end of a bar disposed above said foot pedal, said bar being pivotally mounted to another rod at its other end, said last mentioned rod lying in a substantially parallel plane to the first mentioned rod, but passing upward therefrom, said bar being pivotally mounted to a fixed support at a point intermediate the mountings of said rods, said upwardly disposed bar passing, at its upper end, through a fixed retaining collar, and spring attached to said collar and to the end of an S-shaped knife, said S-shaped knife being pivotally mounted in a guard, said guard being provided with an arcuate cut-out portion, said knife blade presenting at its cutting edge the same arc, said knife blade being provided with holes for insertion of pins to retard the passage of said knife beyond said guard and adapted to the adjustment of said knife such that the blade of said knife may pass a pre-determined distance beyond said guard, the aforesaid upwardly-disposed rod being so positioned that depression of said foot pedal will cause said upper end of said upwardly disposed rod to contact with the handle end of said knife, forcing the cutting edge of said knife beyond said guard.

2. An egg breaking device comprising a guard, a knife adapted for movement attached to the guard, said guard having an arcuate cutout portion on one side, said arcuate cutout portion being entirely open and unobstructed from the front whereby an egg to be broken may be inserted therein by a rearward movement of the egg relative to the cut-out portion and engage only the arcuate cutout portion, said knife moving toward said guard from the side thereof opposite the cutout portion so as to penetrate the rear section only of the egg, and means for regulating the depth of a cut.

3. An egg breaker comprising a guard including spaced members having corresponding edge portions cut away to conform approximately to the transverse outline of an egg to provide a rest in which an egg may be seated by a rearward movement thereof relative to the guard, a knife operable between the said members and pivoted at one end to one side of the cut away portions thereof and having a concave cutting edge to cut through the rear section only of the shell of an egg at a median point without rupturing the yolk-enclosing membrane, and operating means for the knife.

4. An egg breaker comprising a guard including spaced members having corresponding edge portions cut away to conform approximately to the transverse outline of an egg to provide a rest, a knife operable between the said members and pivoted at one end to one side of the cut away portions thereof and having a concave cutting edge to cut through the shell of an egg at a median point without rupturing the yolk-enclosing membrane, said knife having a plurality of holes in its length, and a pin selectively insertable in one of the holes and projecting beyond the sides of the knife to engage both members of the guard and limit the forward movement of the knife and its penetration through the shell of an egg.

5. An egg breaker comprising a support, a guard consisting of a strap doubled upon itself to provide spaced members connected at one end and fast at the opposite end to the support, corresponding edge portions of the members being cut away to conform approximately to the transverse outline of an egg to provide a rest, a knife pivoted adjacent an end to the guard members and having an extension, said knife having a concave cutting edge and provided with a plurality of holes in its length, a pin insertable in one of the holes of the knife to engage both guard members and limit the forward movement of the knife, and an actuating element adapted to engage the said extension of the knife for operating the latter.

6. An egg breaker comprising an egg positioning member unobstructed from the front and having an arcuate cut-out portion forming a rest against which an egg may be positioned by a rearward movement thereof relative to the rest for effecting a cracking operation on the rear section of the shell, a knife movably supported for coaction with the rest and movable in a direction opposite to the rearward movement of the egg, the knife having an arcuate cut-out portion having a sharp edge which is movable past the arcuate shaped cut-out portion of the guard, means for limiting the movement of the knife with relation to the guard and the rear section of the egg to thereby penetrate the rear section of the egg a predetermined distance, and means for effecting movement of the knife to and from the shell cracking position.

7. An egg breaker comprising a table, a rigid, upright, member fixedly secured to the table and having an egg positioning portion unobstructed from the front against which an egg may be positioned by a rearward movement of the egg relative to the egg positioning portion for effecting a cracking operation on the rear section of the shell, a knife swingingly supported adjacent said member so that it can effect a cutting action on the rear section of the egg shell when the egg is thus positioned, means for limiting the egg breaking movement of the knife so that the knife can penetrate the rear section of the egg only a limited distance, means whereby to effect movement of the knife for the purposes stated, and means for normally maintaining the knife in inoperative position.

RICHARD W. REGENSBURGER.